(12) United States Patent
Banerjea

(10) Patent No.: US 8,570,925 B2
(45) Date of Patent: Oct. 29, 2013

(54) SYSTEMS AND METHODS FOR REDUCING POWER CONSUMPTION IN WIRELESS DEVICES

(75) Inventor: Raja Banerjea, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 615 days.

(21) Appl. No.: 12/491,167

(22) Filed: Jun. 24, 2009

(65) Prior Publication Data

US 2010/0009725 A1    Jan. 14, 2010

Related U.S. Application Data

(60) Provisional application No. 61/079,630, filed on Jul. 10, 2008.

(51) Int. Cl.
*G08C 17/00* (2006.01)
*H04B 1/16* (2006.01)

(52) U.S. Cl.
USPC .................................. 370/311; 455/343.4

(58) Field of Classification Search
USPC ........ 455/571–574, 432.3, 432.1, 435.1, 450, 455/451, 452.1, 455, 11.1, 13.1, 13.4, 41.2, 455/509, 516, 522, 550.1, 552.1, 553.1, 455/127.1, 310.2, 328–331, 304, 324, 336, 455/341, 350–356, 503, 418–422.1, 443, 455/444, 446–448, 151.2, 343.1–343.6; 370/310.2, 328–331, 304, 324, 336, 370/341, 503, 571–574, 432.3, 432.1, 370/435.1, 450, 451, 452.1, 455, 11.1, 13.1, 370/13.4, 41.2, 509, 516, 522, 550.1, 552.1, 370/553.1, 127.1, 343.1, 343.5, 353.6, 311, 370/322, 350–356, 431
See application file for complete search history.

(56) References Cited

U.S. PATENT DOCUMENTS 6,748,481 B1    6/2004  Parry et al.
6,804,542 B1 *  10/2004 Haartsen ...................... 455/574
(Continued)

FOREIGN PATENT DOCUMENTS

| JP | 2004007029 | 1/2004 |
|---|---|---|
| JP | 2007221628 | 8/2007 |
| JP | 2007336027 | 12/2007 |

OTHER PUBLICATIONS

"Information technology-Telecommunications and information exchange between systems-Local and metropolitan area networks-Specific requirements-Part 11: Wireless LAN Medium Access Control (MAC) and Physical Layer (PHY) specifications". International Standard ISO/IEC 8802-11, First edition, 1999, pp. 1-532.

(Continued)

*Primary Examiner* — Jinsong Hu
*Assistant Examiner* — San Htun

(57) ABSTRACT

A method for reducing power consumption in wireless devices includes establishing a wireless link between a local device and a remote device and sending a message to the remote device across the wireless link. The message may specify a communication schedule. Communications between the local device and the remote device are performed according to the communication schedule. The communication schedule specifies time periods in which data is not transferred between the local device and the remote device, and during such time periods at least one of the local device or the remote device enters a low power mode.

19 Claims, 4 Drawing Sheets

(56) References Cited

U.S. PATENT DOCUMENTS

| | | | |
|---|---|---|---|
| 6,968,219 B2 | 11/2005 | Pattabiraman et al. | |
| 7,079,812 B2 | 7/2006 | Miller et al. | |
| 7,733,835 B2* | 6/2010 | Sammour et al. | 370/338 |
| 2004/0223479 A1* | 11/2004 | Vallstrom et al. | 370/338 |
| 2005/0135302 A1 | 6/2005 | Wang et al. | |
| 2005/0169201 A1* | 8/2005 | Huylebroeck | 370/311 |
| 2007/0037609 A1 | 2/2007 | Zhang et al. | |
| 2007/0232358 A1* | 10/2007 | Sherman | 455/560 |
| 2009/0327713 A1* | 12/2009 | Marin et al. | 713/168 |

OTHER PUBLICATIONS

Syed Aon Mujtaba, "TGn Sync Proposal Technical Specification", IEEE P802.11, May 18, 2005, pp. 1-131.

Correspondence enclosing Non-Final Office Action received for Japanese Application No. 2011-517462 dated Jul. 3, 2012; 15 pages.

Patent Office of the People's Republic of China Office Action for related Chinese Application No. 200980126649.5; Jan. 25, 2013; 8 pages.

* cited by examiner

SYSTEMS AND METHODS FOR REDUCING POWER CONSUMPTION IN WIRELESS DEVICES

CROSS REFERENCE TO RELATED APPLICATIONS

This application claims the benefit of priority from U.S. Provisional Application No. 61/079,630, filed Jul. 10, 2008, entitled "Power Save Specification for BT AMP Devices" the entire disclosure of which is hereby incorporated herein by reference.

BACKGROUND

The present invention relates to wireless communication, and in particular to systems and methods for reducing power consumption in wireless devices.

Wireless technology provides portable connectivity between electronic devices. Standard wireless communication protocols, such as Bluetooth, have streamlined wireless communications between electronic devices. For example, computer mice (and other pointing devices) have been developed using Bluetooth to provide wireless communication over a few meters of a local device (e.g. laptop computer). Additionally, Bluetooth may include profiles to describe, amongst other things, the uses and/or requirements of remote devices (e.g. pointing devices). This standardization has allowed for the development of many low data rate devices.

Bluetooth has been historically limited to a few Mbits/second in data rate. High data rate applications, such as audio or video streaming, for example, may not be supported by the historical capability of Bluetooth. On the other hand, IEEE (Institute of Electrical and Electronics Engineers) 802.11 protocols may have a data rates up to 54 Mbits/second or higher, and may be able to support a wider number of applications requiring more bandwidth. Unfortunately, IEEE 802.11 has been implemented primarily for full scale networking which may require sophisticated connection setup and may consume more power than a Bluetooth application.

Bluetooth AMP ("BT AMP") mates the standardization of Bluetooth with the bandwidth of IEEE 802.11. BT AMP refers to a Bluetooth protocol that uses an alternate media access controller ("MAC") and physical layer ("PHY"). BT AMP initiates the link between two devices using the Bluetooth protocol, and may use an IEEE 802.11 protocol, for example, to transport large amounts of data, such as audio or video. Above the transport level (in the OSI model) the application may use Bluetooth profiles. Bluetooth simplifies the discovery and setup of services between devices and IEEE 802.11 increases the data rate.

However, many wireless devices are battery operated. For example, from cell phones and personal digital assistants ("PDAs") to wireless speakers and mice, reducing power consumption in wireless devices remains an ongoing challenge.

Thus, it would be desirable to provide reduce power consumption in wireless communications.

SUMMARY

Embodiments of the present invention includes systems and methods for reducing power consumption in wireless devices. In one embodiment, the present invention includes a method for reducing power consumption in wireless devices comprising establishing a wireless link between a local device and a remote device, sending a message to the remote device across the wireless link, the message specifying a communication schedule, and communicating between the local device and the remote device according to the communication schedule. The communication schedule specifies time periods in which data is not transferred between the local device and the remote device, and during the time periods at least one of the local device or the remote device enters a low power mode.

In one embodiment, the message is sent across the wireless link using a first wireless protocol and communicating between the local device and the remote device is performed using a second wireless protocol.

In one embodiment, the first wireless protocol is Bluetooth and the second wireless protocol is an IEEE 802.11 protocol.

In one embodiment the local device and the remote device communicate using a BT AMP protocol.

In one embodiment, the method further comprises determining the communication schedule from a Bluetooth profile on the local device.

In one embodiment the Bluetooth profile indicates a start time, a duration, and a periodicity for communicating between the local device and the remote device.

In one embodiment, the message is a pre-existing message of a wireless protocol. In one embodiment, the wireless protocol is Bluetooth. In another embodiment, the wireless protocol is an IEEE 802.11 protocol.

In one embodiment, the pre-existing message is an interference message.

In one embodiment the message is an activity report, and wherein the communication schedule is sent in the activity report.

In one embodiment communicating includes transferring audio data to the remote device based on the communication schedule, and the communication schedule transfers sufficient audio data to the remote device to stream a corresponding audio signal without interruption.

In one embodiment, during the time periods, the local device enters a low power mode and the remote device does not enter a low power mode. Additionally, in another embodiment, the method further includes periodically sending a request-to-send message from the remote device to the local device, wherein the local device responds to the request-to-send message with a clear-to-send message if the request-to-send message is received by the local device when the local device is not in low power mode.

In one embodiment, during the time periods, the remote device enters a low power mode.

In another embodiment the present invention includes an electronic device comprising a wireless transmitter, a wireless receiver, and a controller configured to use the wireless transmitter and the wireless receiver to establish a wireless link between the electronic device and a remote device to provide communication with the first remote device, and send a message to the remote device across the wireless link the message specifying a communication schedule that specifies time periods in which data is not transferred between the electronic device and the remote device. Communication occurs in accordance with the communication schedule, and during the time periods at least one of the electronic device or the remote device enters a low power mode.

In one embodiment, the message is sent across the wireless link using an activity report in a Bluetooth protocol and at least a portion of the communication between the electronic device and the remote device is performed using an IEEE 802.11 protocol, and the time periods occur when the communication is performed using the IEEE 802.11 protocol.

In one embodiment, the electronic device and the remote device communicate using a BT AMP protocol.

In one embodiment the communication schedule is determined from a Bluetooth profile on the electronic device, and wherein the Bluetooth profile indicates a start time, a duration, and a periodicity for communicating between the electronic device and the remote device.

In another embodiment, the present invention includes wireless system using the methods and electronic devices described herein.

The following detailed description and accompanying drawings provide a better understanding of the nature and advantages or the present invention.

DETAILED DESCRIPTION

Described herein are systems and methods for reducing power consumption in wireless devices. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
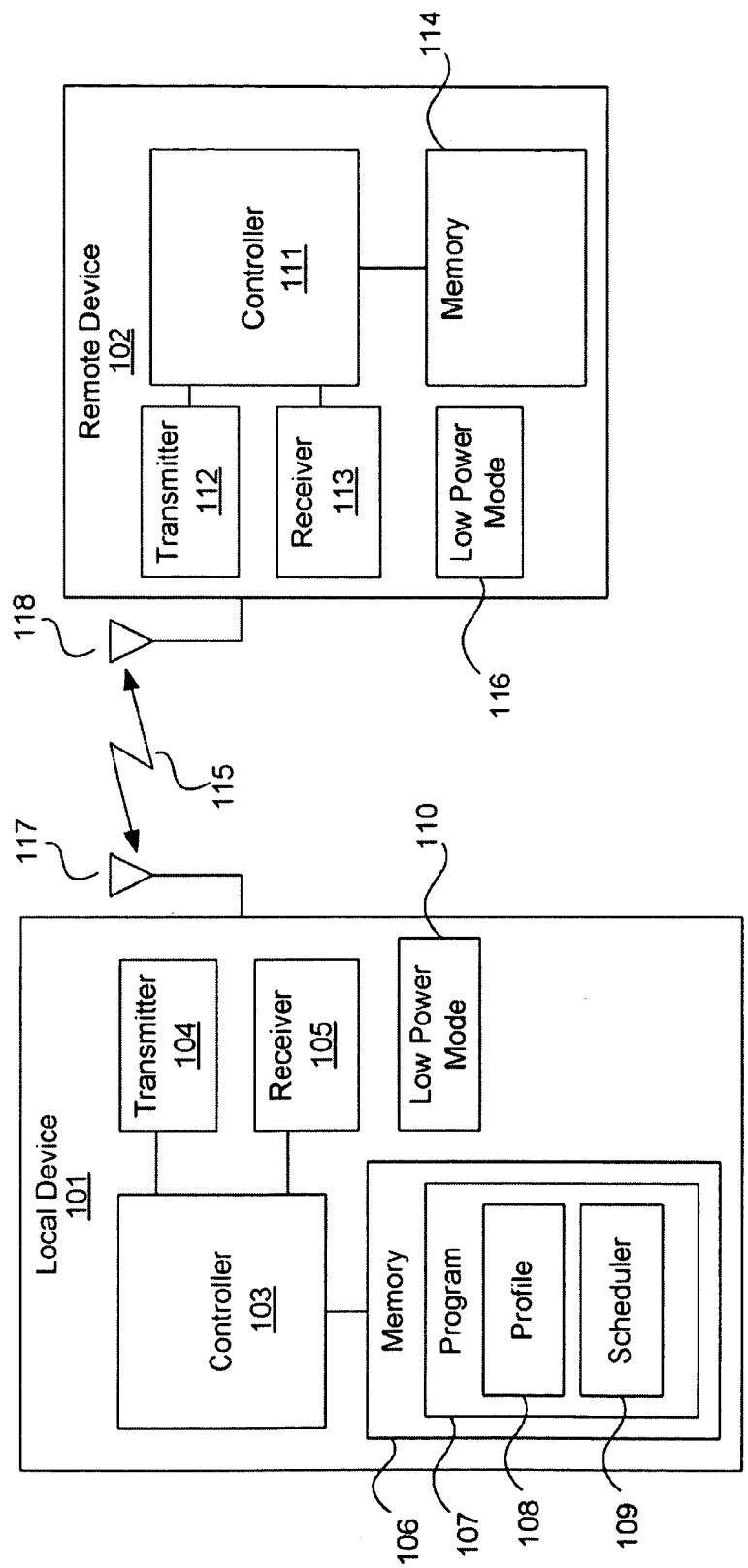
FIG. 1 illustrates a wireless system according to one embodiment of the invention.

FIG. 1 illustrates a wireless system 100 according to one embodiment of the present invention. Wireless system 100 includes a wireless local device 101 and a wireless remote device 102. Local device 101 includes controller 103 coupled to transmitter 104 and receiver 105. Controller 103 is coupled to memory 106. Remote device 102 includes controller 111 coupled to transmitter 112 and receiver 113. Controller 111 is coupled to memory 114. A wireless link 115 is established between local device 101 and remote device 102 using antennas 117-118 controller 103, controller 111, transmitter 104, transmitter 112, receiver 105, receiver 113, memory 106, and memory 114. The components of local device 101 and remote device 102 shown in FIG. 1 may be illustrative of wireless systems including hardware and software for implementing a variety of wireless protocols such as a Bluetooth protocol, an 802.11 protocol, or a combination of wireless protocols such as BT AMP, for example.

Features and advantages of the present invention include sending a message from the local device 101 to the remote device 103 across the wireless link 115 to reduce power consumption in either or both of the devices. In one embodiment, the message may specify a communication schedule. The communication schedule, in turn, may specify the timing of transmissions. For example a communication schedule may specify time periods during which data is, and is not, transferred between the local device 101 and the remote device 102. Accordingly, if the local device 101 and the remote device 102 communication (e.g., transfer data) according the communication schedule, either or both devices may enter a low power state during the time periods when data is not being transferred.

An example of a wireless system 100 shown in FIG. 1 may be a BT AMP system, for example. A BT AMP system 100 mat include a Bluetooth MAC/PHY and an 802.11 MAC/PHY, which are illustrated generally as wireless controllers, transmitters, and receivers in FIG. 1, but are understood by those skilled in the art to include specific hardware and software. For instance, in BT AMP system 100 the memory 106 may include a program 107 representing an application layer, for example. In one embodiment of the present invention, program 107 may include one or more Bluetooth profiles 108 and scheduler 109. A Bluetooth profile is a wireless interface specification for Bluetooth-based communication between devices. A Bluetooth profile may reside at the application layer on top of BT AMP MAC and PHY. Different profiles 108 may be used for establishing wireless communications with different types of Bluetooth enabled remote devices, and may include information for specifying how data is transferred between the local device 101 and the remote device 102. For example, if the remote device 102 is an audio/video device, profile 108 may be an Audio Video Remote Control Profile ("AVRCP"). In one embodiment, the profile 108 may indicate the data rate required for remote device 102 and/or what transmission time intervals may be used for communicating between local device 101 and remote device 102. The profile 108 may also indicate, amongst other things, a start time, duration, and periodicity of the communication between local device 101 and remote device 102, for example. In this example, the scheduler 109 may use information from the profile 108 to generate a communication schedule. For example, scheduler 109 may determine transmission intervals from the profile 108 to generate a communication schedule to instruct the remote device 102 when data transmissions are to occur. Communication schedules may be sent from local device 101 to remote device 102 to control power usage in either or both devices. Accordingly, either, or both, local device 101 and remote device 102 may include low power modes 110 and 116, respectively, for powering down one or more portions of either device during time periods when data is not being transferred as determined by the profile 108, for example.

In one embodiment, the communication schedule may be transmitted using a pre-existing message specified by the wireless protocol being used for the wireless link 115. For example, in some wireless protocols, specific messages are used to communicate interference which may be present in the operating environment of the local device 101 and the remote device 102. For example, the Bluetooth protocol includes activity reporting which allows wireless communication to take into account certain types of interference. Accordingly in one embodiment, the message for carrying the communication schedule is an activity report of the Bluetooth protocol. For example, the message specifying the communication schedule may be sent in an activity report of the BT AMP protocol. As another example, IEEE 802.11v includes co-located interference messaging to prevent simultaneous transmission of multiple radios on a single system. In this case, IEEE 802.11v includes a co-located interference message that may be sent from local device 101 to remote device 102 to identify time periods in which transmissions are not exchanged between local device 101 and remote device 102 so that multiple radios in the same device do not interfere with each other (e.g., if a BT transmission is occurring in a BT AMP system, the 802.11 transmission may be shut down so the two protocols do not interfere with each other). Accordingly, another embodiment of the present invention includes sending a communication schedule in an interference message of an 802.11 protocol. In other wireless protocols, other pre-existing messages, such as interference messages, may be used for sending communication schedules.

Communication schedules may be used to control power in the local device 101 and remote device 102. For example remote device 102 may have a requirement of receiving 100 kbits every 100 ms and a capability to receive data at a rate of 20 Mbits/second. The communication schedule may schedule a 5 ms interval to transfer 100 kbits every 100 ms period. During the other 95 ms of time local device 101 may utilize a low power mode 110 and shut down one or more portions of electronics in local device 101 to save power (e.g., transmitter 104 and receiver 105 may be turned off). Similarly, during the other 95 ms of time, one or more portions of electronics in remote device 102 (e.g., transmitter 112 and receiver 113) may be disabled using low power mode 116 to save power, for example. Accordingly, scheduling time for communications allows either, or both, local device 101 and remote device 102 to schedule time periods in which one or more portions of the local device 101 and remote device 102 may be turned off in order to save power.

In some applications, some remote devices may not be capable of scheduling communications as specified in the communication schedule. Accordingly, in one embodiment remote device 102 may periodically send a request-to-send message to local device 101. The request-to-send message may indicate that remote device 102 is ready to receive data from local device 101, for example. Local device 101 may be transitioning in and out of a low power mode based on the communication schedule. Accordingly, local device 101 may respond to the request-to-send message from the remote device 102 with a clear-to-send message if the request-to-send message is received by local device 101 when local device 101 is not in low power mode. A clear-to-send message may indicate that local device 101 has received the request-to-send message. If remote device 102 receives the clear-to-send message, it may prepare itself to receive data from local device 101. After sending the clear-to-send message, and possibly after an additional wait time, local device 101 may start sending data, for example.

Figure 2:
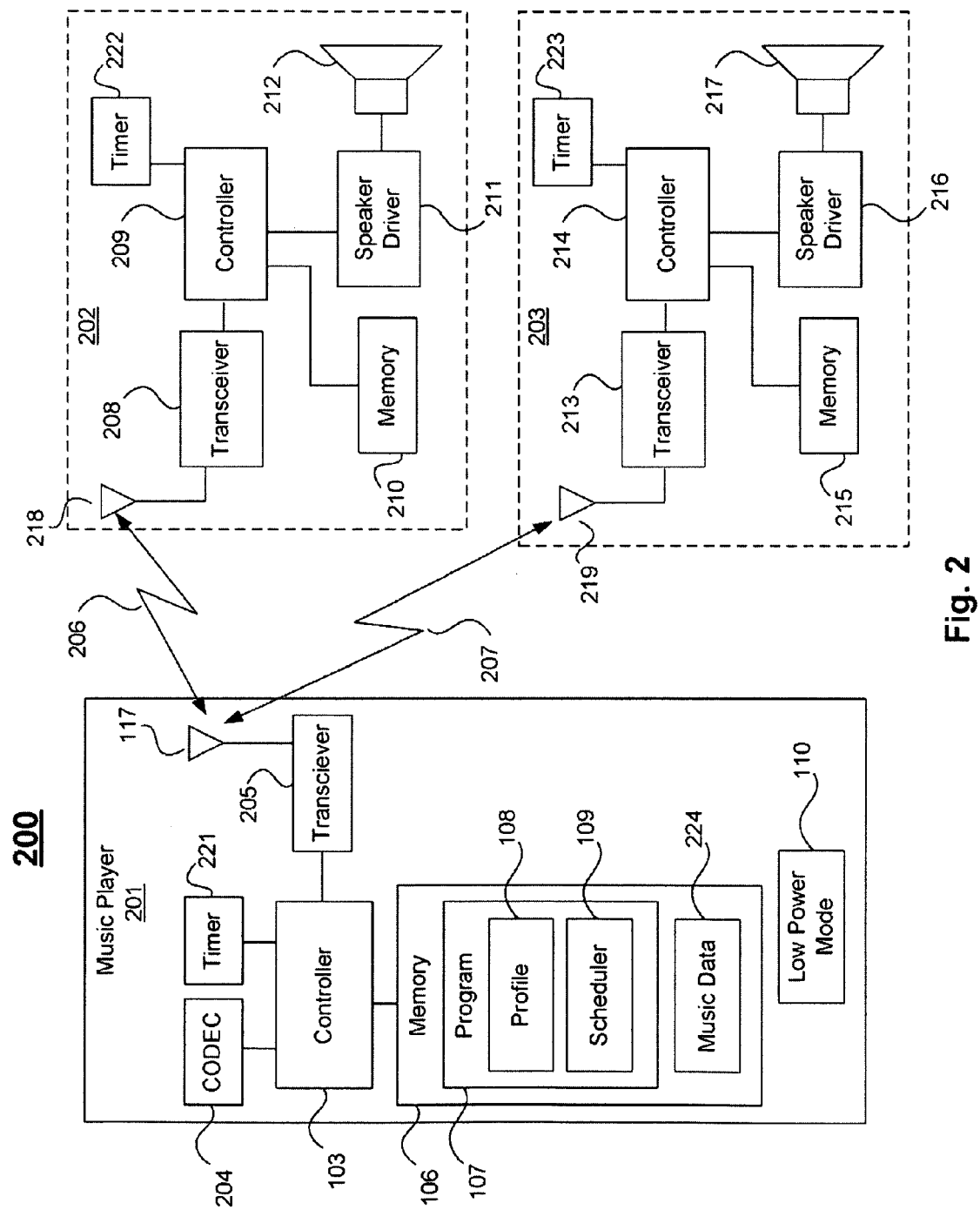
FIG. 2 illustrates an example wireless system according to another embodiment of the invention.

FIG. 2 illustrates an example wireless system 200 according to another embodiment of the invention. Wireless system 200 includes music player 201, audio amplifier 202, and audio amplifier 203. In this example application, audio amplifiers 202-203 are remote wireless devices. Music player 201 transmits music data 224 to audio amplifiers 201-202 using the BT AMP protocol, and music player 201 and/or audio amplifiers 201-202 may enter low power modes to reduce power consumption.

Music player 201 includes controller 103, memory 106, and antenna 117 which are utilized to communicate with the remote wireless devices (e.g., audio amplifiers 202-203). In this embodiment, music player 201 utilizes BT AMP transceiver 205 to transmit and receive signals from audio amplifiers 202-203. Music player 201 utilizes scheduler 109 to generate communication schedules for the transmission of audio data. Scheduler 109 may use one or more profiles 108 (e.g., AVRCP) for sending audio data to audio amplifiers 202-203 using the BT AMP protocol. Timer 221-223 may be time synchronization field ("TSF") timers that maintain the timing for the communication schedules. CODEC 204 may be used to generate the audio data to be sent to audio amplifiers 202-203, for example.

Audio amplifiers 202-203 may be set up to provide audio sound from speakers 212 and 217. Audio amplifiers 202-203 may be coupled to receive power from a residential AC power source or may be battery powered. Audio amplifier 202 includes controller 209 coupled to timer 222, transceiver 208, memory 210, and speaker driver 211. Transceiver 208 and antenna 218 receive and transmit data from the local device (e.g., music player 201). Transceiver 208 is coupled to exchange data with controller 209. Controller 209 may store received data in memory 210. The size of memory 210 may be dictated by the profile 108 corresponding to audio amplifier 202. Controller 209 provides data to speaker driver 211 which in turn drives speaker 212 to produce the desired sound.

Audio amplifier 203 may be similar to audio amplifier 202. Antenna 219, transceiver 213, controller 214, memory 215, speaker driver 216, speaker 217, and timer 223 in audio amplifier 203 may operate the same as corresponding components in audio amplifier 202. Audio amplifier 203 may be designated as a right channel and audio amplifier 202 may be designated as a left channel of a stereo output. Designations may be stored in memories 210 and 215 to indicate the corresponding channels. Configuration designators, such as jumpers or toggle switches, may also be used to designate the channel of the stereo output.

Music player 201 may be equipped with BT AMP and utilize the activity reporting of the protocol in order to schedule the transmission of audio data to audio amplifier 202 and audio amplifier 203. Accordingly, a BT AMP link 206 is established between music player 201 and audio amplifier 202, and a BT AMP link 207 is established between music player 201 and audio amplifier 203. The Bluetooth protocol may be used to establish the connection between music player 201 and each audio amplifier 202 and 203. Thereafter, an IEEE 802.11 may be used to send data from the music player 201 to each audio amplifier 202 and 203.

In this embodiment, controller 103 may utilize scheduler 109 to create a communication schedules based on one or more profiles 108. The communication schedules may be sent in a separate activity report to each of the audio amplifiers 202-203. For example, profiles 108 may indicate that a rate of 384 kbits/second is required so that stereo output from speakers 212 and 217 continues uninterrupted. In a 100 ms time period, 38.4 kbits may be required for each of the speakers 212 and 217 to achieve a continuous audio signal. IEEE 802.11g may be used at the transport level to transmit data at a rate of 20 Mbits/second. A sample calculation is shown below.

Audio data rate (each channel)=384 kbits/second
D=amount of audio data for 100 ms period=38.4 kbits
$R_t$=Transmission rate=20 Mbits/second
T=time to transmit $$T = \frac{D}{R_t} = \frac{38.4 kbits}{20 Mbits/\sec} = 1.92 \text{ms}$$

The scheduler 109 may generate a communication schedule specifying 2 ms to transmit left channel data to audio amplifier 202 and 2 ms to transmit right channel data to audio amplifier 203, and 96 ms of power save time. The communication schedule may be sent in an activity report to each amplifier. The parameters of the message are:
1. Start time: The time when the interference starts based on a local timer
2. Duration: The duration active traffic can last for
3. Periodicity: The periodicity of the traffic.

In this case, the information in the activity report for each amplifier may be as follows.

Activity Report Message for Audio Amplifier 202
   1) Start time: at time point 0
   2) Duration of transmission: 2 ms
   3) Periodicity: every 100 ms
Activity Report Message for Audio Amplifier 203
   1) Start time: at time point 2 ms
   2) Duration of transmission: 2 ms
   3) Periodicity: every 100 ms If more audio amplifiers are added to system 200, additional transmission time may be scheduled accordingly by sending activity report messages to each of the audio amplifiers to schedule the additional transmissions.

The low power mode 110 may be used to put music player 201 in a sleep mode during the 96 ms power save period. In this situation, timer 221 may need to remain active in order to determine when music player 201 is to "wake up" from the sleep mode and again transmit audio data. During the power save period, audio amplifiers 202 and 203 may disable transceivers 208 and 213, respectively, and/or other circuitry which is not needed in order to reduce power at the remote devices.

In another embodiment, music player 201 may have a plurality of transceivers and antennas sending audio data over a plurality of links to a plurality of audio amplifiers simultaneously. This embodiment may utilize IEEE 802.11n at the transport level.

In another embodiment, video data may be transmitted rather than audio data. The periodicity of the scheduling may differ and the duration of each burst may be greater due to the increase in video data requirements. It is to be understood that a wide variety of other devices may use the above described techniques for reducing power consumption in other systems where local and remote devices communicate over a wireless link.

Figure 3:
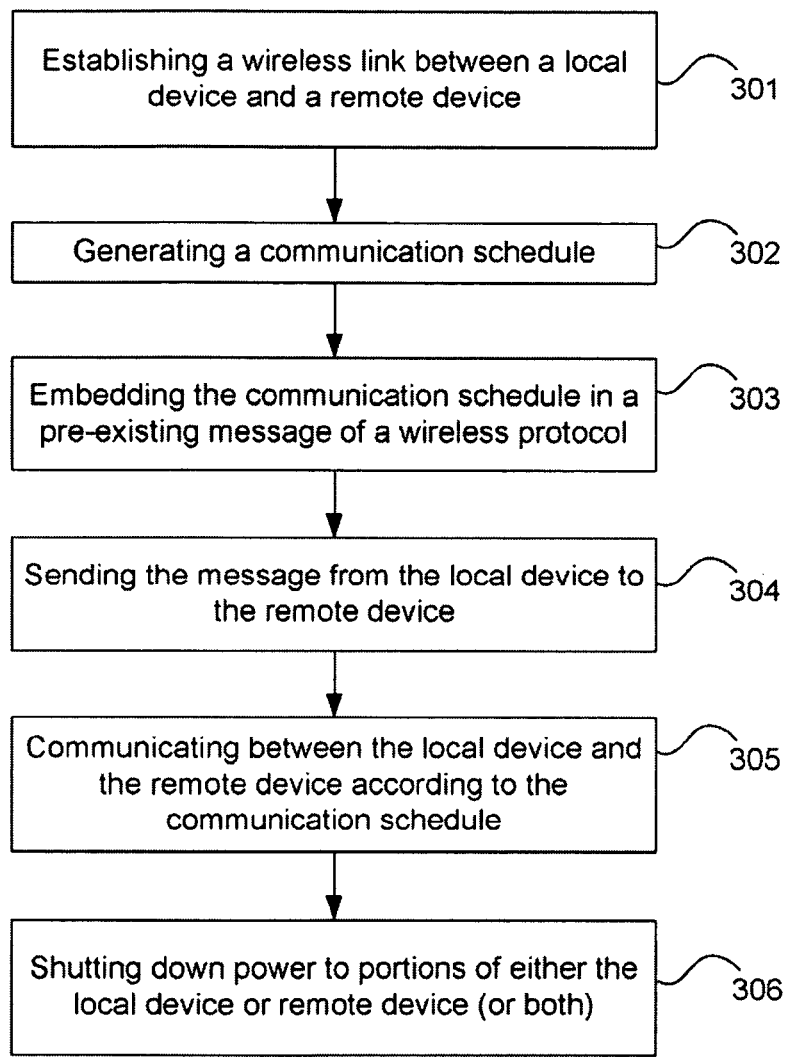
FIG. 3 illustrates a method of reducing power consumption in wireless devices according to one embodiment of the invention.

FIG. 3 illustrates a method 300 of reducing power consumption in wireless devices according to one embodiment of the invention. At 301, a wireless link is established between a local device and a remote device. At 302, a communication schedule is generated. The communication schedule may be generated based on a profile available to the local device, which may be a Bluetooth profile, for example. If BT AMP is being used within the local device, a profile may be used to determine the amount of data required by one or more remote devices for a particular time period. The data rate capabilities may be used to determine when the local device may send a burst of data to a remote device. At 303, the communication schedule is embedded in a pre-existing message of a wireless protocol. The pre-existing message may be an interference message for example, which may used by the protocol to adjust communications based on interference patterns but is being used in this embodiment for sending the communication schedule, for example. This message may also be an activity reporting message, for example. At 304, the message is sent from the local device to remote device. The message may communicate information to the remote device concerning, for example, start times, duration, and periodicity of the transmissions from the local device to the remote device. At 305, the local device communicates with the remote device according to the communication schedule in the message. This may include periodically alternating between transmitting for a time period and not transmitting for a time period. At 306, the local device or remote device, or both, may enter a low power mode by shutting down power to one or more circuit components in the respective system. The local device may be utilizing IEEE 802.11g to transport the data at a high data rate such that the remote device receives the required amount of data in short bursts, and during the remainder of the communication time period portions of the circuitry of the local device and the remote devices may be turned off or configured in a low quiescent current state. A low power mode may be used to save power during these time periods.

Figure 4:
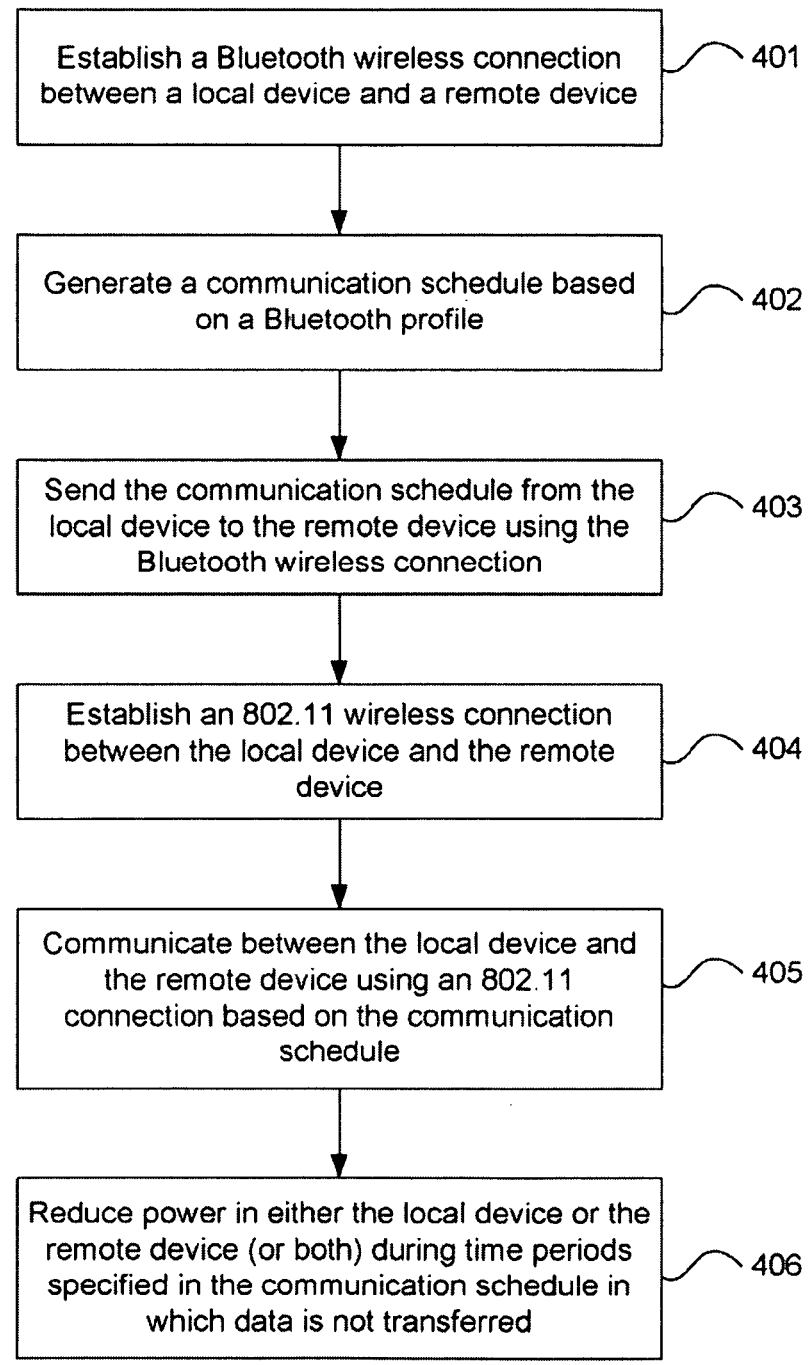
FIG. 4 illustrates another method of reducing power consumption in wireless devices according to one embodiment of the invention.

FIG. 4 illustrates another method of reducing power consumption in wireless devices according to one embodiment of the invention. In this example, local and remote devices may communicate using the BT AMP protocol. For example, devices may connect to each other at close ranges (less than 10 m) and use both Bluetooth and IEEE 802.11 protocols across a wireless link. A Bluetooth wireless channel may always be on and operational and an IEEE 802.11 channel may be used to transfer bulks of data at high speed. For instance, there are some applications, such as video and music playback, which may require a high speed link to be operational over a long duration of time. Accordingly, method 400 may start with a Bluetooth wireless connection being established between a local device and a remote device at 401. This step may include discovery of the remote device using the Bluetooth connection, for example. At 402, a communication schedule may be generated based on one or more Bluetooth profiles on the local device, for example. The communication schedule may indicate what time periods during a communication that data is, or is not, transmitted. At 403, the communication schedule is sent from the local device to the remote device using the Bluetooth connection. As mentioned above, the BT-AMP protocol provides a mechanism called activity reporting which allows the local device to indicate to the remote device the pattern of interference it is experiencing. The information in this message allows the remote device to schedule the transmission of data to the local device around the interference. As mentioned above, some embodiments of the present invention use this message as a communication schedule so that the local and/or remote device may reduce power when not in use. At 404, an 802.11 wireless connection is established between the local device and the remote device. This connection may be used for communicating large amounts of data between the local and remote devices at very high speeds as mentioned above, and the communication may be performed according to the communication schedule that was shared between the local and remote devices. At 405, communication between the local device and remote device is performed using the 802.11 connection based on the communication schedule, which may have been sent in the activity report, for example. During this time, data may be transmitted from the local device to the remote device for 20 ms, and then the transmission may be halted for 80 ms, for example, as specified in the communication schedule. At 406, power is reduced in either the local or remote devices (or both) during time periods specified in the communication schedule when data is not transferred, thereby reducing power consumption.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for reducing power consumption in wireless devices, the method comprising:
   generating a communication schedule in a local device based on a profile stored in the local device, wherein the communication schedule specifies (i) a first duration of time during which data is transferred between the local device and a remote device, and (ii) a second duration of time during which data is not transferred between the local device and the remote device, and wherein the profile indicates (i) a start time, (ii) a duration, and (iii) a periodicity for communicating between the local device and the remote device using a wireless protocol at a close range;

establishing a wireless link between the local device and the remote device;

sending the communication schedule in a message to the remote device across the wireless link, wherein the message is a pre-existing message of the wireless protocol used to communicate interference present in an operating environment of the local device and the remote device; and communicating between the local device and the remote device according to the communication schedule, wherein, during the second duration of time, at least one of the local device or the remote device enters a low power mode.

2. The method of claim 1, wherein;
the message is sent across the wireless link using a first wireless protocol; and
the communicating between the local device and the remote device is performed using a second wireless protocol.

3. The method of claim 2, wherein;
the first wireless protocol is Bluetooth; and
the second wireless protocol is an Institute of Electrical and Electronics Engineers (IEEE) 802.11 protocol.

4. The method of claim 3, wherein the pre-existing message is an activity report, and wherein the communication schedule is sent in the activity report.

5. The method of claim 1, wherein the local device and the remote device communicate using a Bluetooth Alternate MAC/PHY (BT AMP) protocol.

6. The method of claim 1, further comprising determining the communication schedule from a Bluetooth profile on the local device.

7. The method of claim 1, wherein the wireless protocol is Bluetooth.

8. The method of claim 1, wherein the wireless protocol is an Institute of Electrical and Electronics Engineers (IEEE) 802.11 protocol.

9. The method of claim 1, wherein:
the communicating includes transferring audio data to the remote device based on the communication schedule; and
the communication schedule transfers sufficient audio data to the remote device to stream a corresponding audio signal without interruption.

10. The method of claim 1, wherein during the second duration of time, the local device enters the low power mode and the remote device does not enter the low power mode.

11. The method of claim 10, further comprising:
periodically sending a request-to-send message from the remote device to the local device,
wherein the local device responds to the request-to-send message with a clear-to-send message if the request-to-send message is received by the local device when the local device is not in the low power mode.

12. The method of claim 1, wherein during the second duration of time, the remote device enters the low power mode.

13. The method claim 1, further comprising adjusting communication between the local device and the remote device based on the interference.

14. The method claim 1, further comprising scheduling communication between the local device and the remote device based on the interference.

15. The method of claim 1, further comprising communicating between the local device and the remote device using a second wireless protocol to transfer bulks of data at high speed.

16. A wireless device comprising:
a wireless transmitter;
a wireless receiver; and
a controller configured to
generate a communication schedule in the wireless device based on a profile stored in the wireless device, wherein the communication schedule specifies (i) a first duration of time during which data is transferred between the wireless device and a remote device, and (ii) a second duration of time during which data is not transferred between the wireless device and the remote device, and wherein the profile indicates (i) a start time, (ii) a duration, and (iii) a periodicity for communicating between the wireless device and the remote device using a wireless protocol at a close range;
use the wireless transmitter and the wireless receiver to establish a wireless link between the wireless device and the remote device; and
using the transmitter, send the communication schedule in a message to the remote device across the wireless link, wherein the message is a pre-existing message of the wireless protocol used to communicate interference present in an operating environment of the wireless device and the remote device,
wherein the communication occurs in accordance with the communication schedule, and
wherein, during the second duration of time, at least one of the wirelesses device or the remote device enters a low power mode.

17. The wireless device of claim 16, wherein:
the message is sent across the wireless link using an activity report in a Bluetooth protocol; and
at least a portion of the communication between the wireless device and the remote device is performed using an Institute of Electrical and Electronics Engineers (IEEE) 802.11 protocol.

18. The wireless device of claim 16, wherein the wireless device and the remote device communicate using a Bluetooth Alternate MAC/PHY (BT AMP) protocol.

19. A wireless system comprising the wireless device of claim 16.

* * * * *